No. 856,352. PATENTED JUNE 11, 1907.
R. L. MAGOON.
MOUTH PROP.
APPLICATION FILED OCT. 11, 1906.
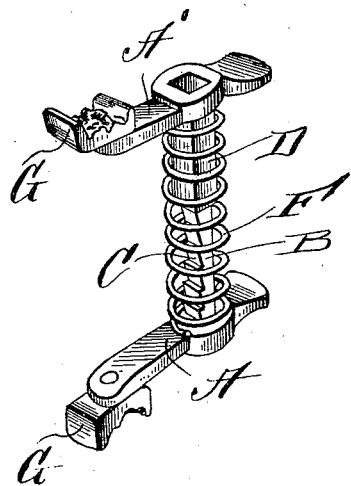
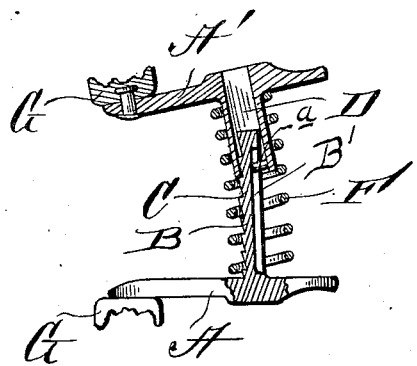

UNITED STATES PATENT OFFICE.

ROY L. MAGOON, OF GRACEVILLE, MINNESOTA.

MOUTH-PROP.

No. 856,352.  Specification of Letters Patent.  Patented June 11, 1907.

Application filed October 11, 1906. Serial No. 338,520.

*To all whom it may concern:*

Be it known that I, ROY L. MAGOON, a citizen of the United States, residing at Graceville, in the county of Bigstone and State of Minnesota, have invented certain new and useful Improvement in Mouth-Props; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in self-adjusting, anesthetic mouth props and comprises details of construction and combinations and arrangements of parts which will be hereinafter fully described and then specifically defined in the appended claim.

I illustrate my invention in the accompanying drawings, in which:—

Figure 1 is a perspective view through my improved jaw distending device or prop, and Fig. 2 is a sectional view longitudinally through the device, showing the invention locked in an adjusted position.

Reference now being had to the details of the drawings by letter, A and A' designate two arms, the former of which has an integral solid shank portion B with ratchet teeth C upon one edge thereof. Said shank portion is made preferably square in outline and is adapted to telescope within the hollow square-outlined shank D of the arm A'. A spring F is interposed between said arms and about the shank portions thereof, the office of which spring is to normally hold the arms at their farthest limit away from each other. Swivelly mounted upon corresponding ends of said arms are the jaw-engaging members G, and the opposite ends of the arms serve as means for engagement with a finger or thumb of an operator, whereby the instrument may be applied to the mouth, and the arms tilted by pressing the two short ends of the arms together, in order to free the end of the hollow shank of the arm A' from one of the teeth upon the shank of the other arm. The teeth being free from the ends of the hollow shank, obviously the two arms may be pressed together under the tension of the spring for the purpose of removing the prop from the mouth of the patient. It will be noted, however, that when no pressure is applied to the two jaw-engaging swiveled members, the end of the hollow shank of the arm A will be thrown into engagement with one of the teeth of the shank upon the other arm, thus securely locking the arms from further tilting movement, it being necessary to tilt back the arms so that the end of the shank portion of the arm A' will be free from the tooth of the other shank, before the two jaw-engaging members may be freed from contact with the jaw of a person. The rear of the shank portion B has a longitudinal groove B' in which a pin *a* carried by the shank D is adapted to have a play, said groove and pin serving to hold the parts together.

By the provision of a mouth-piece made in accordance with my invention, which device is placed between the teeth before the gas is administered, it will be noted that the parts will fold up against the wall of the mouth so as not to interfere with the gas prop or inhaler and it will also be noted that the device may be placed between the front teeth and admit of the administration of gas and then swung either to one side or other giving free access to all parts of the mouth.

What I claim is:—

A mouth prop comprising two arms, one of which is provided with a shank portion having ratchet teeth upon the edge thereof and provided with a longitudinal groove, the other provided with a hollow shank in which the shank with teeth thereon is adapted to telescope, the edge of the hollow shank designed to engage said teeth whereby the arms may be held from moving toward the other, a spring bearing yieldingly between said arms, designed to normally hold the latter at their farthest limit from each other, a pin upon said hollow shank adapted to engage a longitudinal groove in the shank having teeth thereon, as set forth.

In testimony whereof I hereunto affix my signature in the presence of two witnesses.

ROY L. MAGOON.

Witnesses:
M. J. McDONNELL,
MARGARET McDONNELL.